(12) United States Patent
Boggess et al.

(10) Patent No.: US 6,674,971 B1
(45) Date of Patent: Jan. 6, 2004

(54) OPTICAL COMMUNICATION NETWORK WITH RECEIVER RESERVED CHANNEL

(75) Inventors: Timothy P. Boggess, Hooksett, NH (US); John A. Trezza, Nashua, NH (US)

(73) Assignee: Teraconnect, Inc., Nashua, NH (US)

( * ) Notice: Subject to any disclaimer, the term of this patent is extended or adjusted under 35 U.S.C. 154(b) by 555 days.

(21) Appl. No.: 09/653,727

(22) Filed: Sep. 1, 2000

Related U.S. Application Data

(63) Continuation-in-part of application No. 09/653,647, filed on Sep. 1, 2000, now Pat. No. 6,434,308.
(60) Provisional application No. 60/152,212, filed on Sep. 3, 1999, and provisional application No. 60/152,243, filed on Sep. 3, 1999.

(51) Int. Cl.$^7$ ............................................. H04B 10/00
(52) U.S. Cl. ..................... 398/139; 398/45; 398/135; 398/164; 385/14
(58) Field of Search .................... 398/45, 58, 135, 398/139, 164, 202; 385/14

(56) References Cited

U.S. PATENT DOCUMENTS

| | | | |
|---|---|---|---|
| 4,358,858 A | * | 11/1982 | Tamura et al. ............... 398/122 |
| 4,781,427 A | | 11/1988 | Husbands et al. |
| 4,797,879 A | | 1/1989 | Habbab et al. |
| 5,068,801 A | | 11/1991 | Clark et al. |
| 5,083,874 A | | 1/1992 | Aida et al. |
| 5,127,067 A | | 6/1992 | Delcoco et al. |
| 5,150,245 A | * | 9/1992 | Smithgall ..................... 398/45 |
| 5,289,303 A | | 2/1994 | Cloonan et al. |
| 5,339,371 A | | 8/1994 | Tomita |
| 5,479,082 A | | 12/1995 | Calvani et al. |
| 5,532,856 A | | 7/1996 | Li et al. |
| 5,541,759 A | | 7/1996 | Neff et al. |
| 5,801,859 A | | 9/1998 | Yamamoto |
| 5,828,669 A | | 10/1998 | Yamamoto |
| 5,858,814 A | | 1/1999 | Goossen et al. ............. 438/107 |
| 5,884,046 A | | 3/1999 | Antonov |
| 5,887,090 A | | 3/1999 | Rudolph et al. |
| 5,892,605 A | | 4/1999 | Stevens |
| 5,905,873 A | | 5/1999 | Hartmann et al. |
| 5,909,298 A | | 6/1999 | Shimada et al. |
| 5,909,303 A | | 6/1999 | Trezza et al. |
| 5,930,256 A | | 7/1999 | Greene et al. |
| 5,943,150 A | | 8/1999 | Deri et al. |
| 5,999,287 A | | 12/1999 | Davies et al. |
| 5,999,288 A | | 12/1999 | Ellinas et al. |
| 6,108,311 A | | 8/2000 | Ramaswami et al. |
| 6,522,825 B1 | * | 2/2003 | Wachel ....................... 385/135 |

OTHER PUBLICATIONS

Krishnamoorthy, Ashok V., Firehose Architectures for Free–Space Optically–Interconnected VLSI Circuits, Special Issue on Parallel Computing with Optical Interconnects, Journal of Parallel and Distributed Computing, Nov. 1996, pp. 1–10 complete article also see marked up cover and p. 6 included.

Travers, Christine M. et al., VLSI Photonic Smart Pixel Array for I/O System Architectures, pub Jan. 1998, This is best copy found.

(List continued on next page.)

Primary Examiner—Knife-Michael Negash
(74) Attorney, Agent, or Firm—Maine & Asmus

(57) ABSTRACT

An optical transmission device wherein each device has a single dedicated channel for receiving data and destination addressing is not required. The device is formed by constructing an array of transmitter/receiver pairs (transceivers) with a processing means and a gate controller. The network is configured such that transmission on any particular receiver reserved channel results in data being sent to a predetermined node having that particular receiver reserved channel. Data passes through other nodes without pausing to check the address information in the header when the data arrives at a node as is not in the dedicated receiver reserved channel.

38 Claims, 10 Drawing Sheets

OTHER PUBLICATIONS

Kitayama, Ken–Ichi et al, Two Dimensional Parallel Optical Data Link: Experiment* IEEE, 1996 pp. 206–214.

Neff, John A. et al. VCSEL/CMOS Smart Pixel Arrays for Free Space Optical Interconnects, IEEE 1996 pp. 282–289.

Kosaka, Hideo et al., Plastic–Based Receptacle–Type VCSEL–Array Modules with One and Two Dimensions Fabricated Using the Self Allignment Mounting Technique, IEEE 1987 or 1997 pp. 382–385 This is best copy found.

No Author, —Smart Pixel Array (SPA) for VLSI–Photonics, DARPA website, this is the best copy found.

M. Ajmone Marsan et al, Modelling Slotted Multi–Channel Ring All–Optical Networks, *IEEE*, 1997, p. 146–153.

Marco Ajmone Marsan et al, Access Protocols for Photonic WDM Multi–Rings with Tunable Transmitters and Fixed Receivers, *SPIE*, pp. 59–72, vol. 26921.

Carl Beckmann, Applications: Asynchronous Transfer Mode and Synchronous Optical Network, *Handbook of Fiber Optic Data Communication*, 1998, pp. 385–414, Academic Press.

Floyd E. Ross, An Overview of FDDI: The Fiber Distributed Data Interface, *IEEE Journal on Selected Areas in Communications*, Sep. 1989, pp. 1043–1051, vol. 7 No. 7.

* cited by examiner

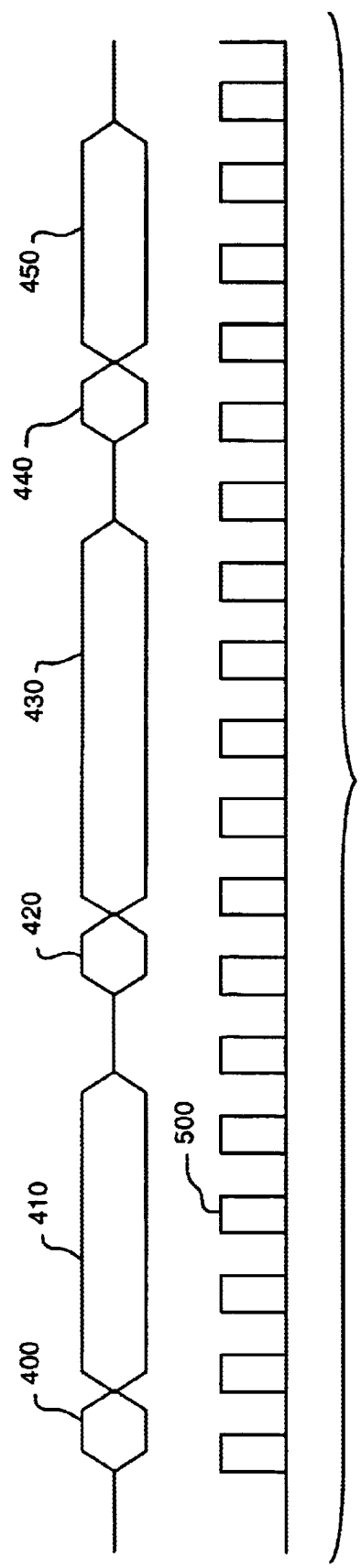

OPTICAL COMMUNICATION NETWORK WITH RECEIVER RESERVED CHANNEL

CROSS REFERENCE TO RELATED APPLICATIONS

This application claims priority from now abandoned U.S. patent application Ser. No. 60/152,212 filed on Sep. 3, 1999 and now abandoned U.S. patent application Ser. No. 60/152,243 filed Sep. 3, 1999 that are incorporated herein by reference for all purposes. This application is a continuation-in-part to the patent application entitled "OPTOELECTRONIC CONNECTOR SYSTEM" by inventor Trezza with serial number 09/653,647, which was filed Sep. 1, 2000, now U.S. Pat. No. 6,434,308, and which is hereby incorporated by reference herein for all purposes.

BACKGROUND OF THE INVENTION

1. Technical Field of the Invention

This invention most generally relates to data transfer and broadband communication networks within a parallel computing system or a local area network. In particular, the present invention relates to a method and system for high bandwidth data transfer using fiber optics.

2. Background of the Invention

Technological advancements have dramatically increased the capabilities and possibilities of computing electronics. The increased bandwidth and data transfer rates have resulted in commercial innovation and scientific advancements in many fields. However, data transfer continues to be a bottleneck. This is true for data transfer within an integrated circuit (IC), from one chip to another, from hybrid circuit to hybrid circuit, from integrated circuit board to another integrated circuit board, and from system to system.

Another driving factor leading to ever increasing demands for faster data transfer rates is the need to do tasks that are more complex, requiring multiple computing nodes to cooperate. Digital signal processing, image analysis, and communications technology all require a greater bandwidth. The demand for increased data transfer capability and greater bandwidth translates into increases in both the speed of the data transfer, and the amount of data that is transferred per unit time.

In general, the problems associated with data transfer within an IC and on a system network are similar. With respect to IC's, increasing the rate of data transfer can be accomplished by increasing the number of data transfer lines and transferring the data in parallel, and/or increasing the transmission speed. There are limitations to the number of I/O lines such as spacing and size requirements, noise problems, reliability of connectors, and the power required to drive multiple lines off-chip. Increasing the transmission speed also has some limitations, as increasing the speed also increases power requirements, introduces timing skew problems across a channel, and usually requires more exotic processing than is standard practice. Combining higher clock speeds and more I/O connections in order to increase bandwidth is exceedingly difficult and impractical using electronics alone.

Using traditional technology, there is a practical upper limit to the number of bit lines that are possible. So long as the technology is based on signals being of an electrical nature, each increase in the number of lines means a corresponding increase in the number of conductors that are required, and the associated problems that are well known in the art.

Due to IC packaging constraints, there is a limited electronic I/O bandwidth. According to present manufacturing techniques, an IC package can have a maximum of approximately five hundred I/O pins due to problems associated with the connections between the IC substrate and the IC package. The most common manufacturing techniques used to interconnect an integrated circuit VLSI die with a package are wire-bonding and tape automated bonding. The maximum clock rate of an I/O pin is typically a few hundred Mbps (millions of bits per second) due to capacitance and inductance and crosstalk associated with the connections between the die and the package. Therefore, the maximum I/O bandwidth of a single IC package is directly proportional to the number of pins times the clock rate per pin. In general, the maximum I/O bandwidth of a packaged IC is typically in the tens of Gigabits/second.

A computer system "bus" is an interconnection allowing communication between plug-in modules. The plug-in modules, typically printed circuit boards (PCB), connect to the bus on a backplane printed circuit board. The data transfers are controlled according to the bus protocol. Plug-in modules typically connect to the bus through edge connectors and drive the bus through high power bus transceivers. Various standards define the physical backplane PCB, the mechanical packaging and the bus protocols. There are also a number of bus standards, including PCI, VME, FutureBus+, and Nubus standards.

There are a number of limitations to the bus connection system. In order to transfer data, a plug-in module typically acts as a bus master, and distributed protocols are used to arbitrate between contending plug-in modules and to appoint the bus-master. To actually transfer data, a bus master inserts the information including address information and data in a series of individual word transfers over the bus. Words usually contain 32 bits and the duration of the word transfer is determined by the nature of the bus protocol. Latency in processing the address information and coordinating the transfer to/from the proper devices is a significant problem. If there are more than a few bus masters, contention for the shared resource (the bus) becomes a major problem, resulting in long wait times to gain mastership of the bus.

Also, capacitive loading on a bus due to the plurality of attached modules increases the propagation delay, which also impacts the data transfer rate. Capacitive loading also decreases the impedance of a bus line to a very low value, and results in high currents required to drive the bus at full speed. Improperly terminated bus lines result in multiple reflections of the transmitted signal. The reflections take one or more bus round trip delays to settle, resulting in a settling time delay that is a significant portion of the transfer cycle time for a bus.

The aforementioned problems limit the bandwidth of bus communications. In addition to low bandwidths, electronic busses lack multiple independent channels and cannot provide the parallelism required by large-scale parallel computing and communication systems. The busses are not scalable to interconnect hundreds of plug-in modules since the increasing capacitance, inductance and impedance problems place a limit on the data transfer speed, and the fact that the single channel is shared among many processing modules results in contention for the single "bottleneck" resource.

A "local area network" (LAN) is a means of interconnecting multiple computers. A variety of standards exist, with the most popular perhaps being the family of "Ethernet" standards (ANSI/IEEE standard 802.3 and others). Like a computer system bus, an Ethernet network consists of a shared medium (coaxial cable) over which all data is transferred. LANs typically have lower bandwidth than system busses, but allow nodes to communicate at larger distances. Several Ethernet standards exist, with data transfer rates of 10 Mbps (millions of bits per second), 100 Mbps and 1 Gbps. Nodes may be separated by distances of up to 100 meters using Ethernet, which is much greater than system bus dimensions that are typically a fraction of a meter.

In recent years, computer system and LAN equipment designers have begun using several techniques for increasing the throughput of data communications. The first is the use of "switched networks," also called "switch fabrics," to eliminate the contention for the single shared resource of a bus or shared-medium LAN. The second is the use of fiber optics to increase the clock speed, and hence the throughput, of data transfers.

In a switched network, the single shared medium is replaced by a series of switches that are interconnected with each other and to the computing nodes (the communication endpoints). All these connections are now point-to-point and usually unidirectional, which allows them to be clocked at a higher rate than comparable bussed connections due to lower capacitance and higher impedance, an additional advantage for electronic implementations. The primary advantage of switched networks is that one pair of nodes can communicate simultaneously with a second pair of nodes, as long as the two pairs do not use the same node-to-switch or switch-to-switch connections. Switched fabrics can also scale to hundreds or thousands of nodes, since all connections are point-to-point and capacitance does not grow linearly with the number of nodes.

One problem with switched networks is that some contention may still exist in the network when more than one pair of nodes tries to communicate, since they both may need to use the same switch-to-switch link along their paths. An ideal switched network is called a "crossbar" and consists of a single large switch that connects directly to all nodes in the system, and can provide contention-free communications among them.

A number of switched fabric standards exist now or have been proposed to replace system busses, including Myrinet, RaceWay, the Scalable Coherent Interconnect (SCI), RapidIO, and InfiniBand. These are sometimes called "system area networks" (SANs) or "storage area networks" if used to connect processors to disk drives. Switch fabric standards are also in widespread use for local area networks, including switched Ethernet, Myrinet, and Asynchronous Transfer Mode (ATM).

Traditional crossbar switches allow any combination of ports to connect simultaneously without internal contention. As a result, every connection must have an $N^2$ controller. For example, 16×16 full-crossbar has 16 input signals and 16 output signals. The 16 output signals are usually to the same 16 hosts, and these output signals have $16^2$ different combinations. Due to the complexity that accompanies the number of ports, and more importantly due to the fact that a large number of signals must fan in or fan out of a single device, it is rare to see a full crossbar larger than 16 ports. In addition, larger crossbar switches are fairly expensive.

A crossbar-switch is an efficient way for electronic equipment to communicate since there is a direct connection between the sender and the receiver. Unfortunately, because every piece of data flows through the switch, a switch failure takes down the entire network. As a result, systems are often built of smaller switches that permit redundancy. However, such redundancy also introduces inefficiencies that are well known and tolerated in the industry.

Typically, crossbar switches require that every port have N pins, where N is at least as wide as the data width (8 bits, for example), but may also including clock and control lines and perhaps separate ground or return lines for each signal. Consequently, a 16×16 port crossbar-switch switch with 20 lines per connection will have either 16 or 32 connectors and 640 wires. Increasing this number to a 64×64 switch with a 64 lines each would require 8192 wires, which implies that the ASIC has 8192 pins just for signals. Even if the switch were built of multiple ASICs, the physical space required to attach 64 connectors is significant and impractical.

Data transfer protocols are established by a number of standards. These standards all employ standard ways of formatting data in discrete chunks called frames or packets. The packet or frame establishes the format of the data and the various fields and headers are encapsulated and transmitted across a network. A frame or packet usually includes a destination address, control bits for flow control, the data or payload, and error checking in the form of cyclic redundancy checks (CRC) codes or an error correcting code (ECC), as well as headers and trailers to identify the beginning and end of the packet. As information is communicated between devices or systems, the address information is checked by each device or system in the network, and eventually the device of interest receives the data.

Whether transferring data within a circuit or connecting system-to-system, the limited bandwidth of conventional hardware does not satisfy the marketplace. For high data rate transmissions, only fiber optics transmit data at Gigabit data rates. Fiber optic communication systems allow information to be transmitted by means of binary digital transmission. The data or information that is to be transmitted is converted into a stream of light pulses, wherein the presence of a pulse corresponds to the transmission of a binary "one," and the absence of light corresponds to the transmission of a binary "zero." An optical receiver is used to convert the stream of light pulses into an electrical signal that is processed to determine the transmitted information.

Fiber-optic standards for LANs exist and are in widespread use today, including the Fiber Distributed Data Interface (FDDI), FibreChannel and several ATM physical layers. Fiber optics are not in widespread use today for system busses, but some standards have been proposed and some prior art exists.

Some attempts have been made to address the aforementioned problems. The use of smart pixels to provide the required interconnection has been developed. "Smart Pixel" refers to the optical interconnection for digital computing systems such as switching systems and parallel-processor systems. For example, large numbers of optical transmitters and receivers are directly integrated with semiconductor electronic processing elements. The integrated optoelectronic circuits have several benefits, including efficiency of design.

However, there are limitations to the electronic interconnects used in current large scale computing and communication networks. The networks have more bandwidth than a bus by providing multiple independent high bandwidth communication channels. But, the cost of these multiple channels is a large number of electronic wires between cabinets and electronic traces on PCB's. The inductance and capacitance of these wires and traces necessitates the use of high power transceivers that consume large amounts of power. The inductance and capacitance of these channels also limits the maximum clock rate and the electrical channels are also susceptible to electromagnetic interference (EMI).

There is some prior art that is directed towards changing from metal traces on a backplane PCB to optical paths through free-space or an optical medium. These passive optical busses still suffer from many disadvantages associated with the electronic bus. The optical bus still supports a single communication channel (as in FDDI) so that data transfers still occur sequentially over the bus. The data transfer requires the same steps as in an electrical backplane, where a bus master is first selected and the bus master then broadcasts data over the optical bus which must be received by all plug-in module PCB's. These PCB's then perform packet processing to determine whether the packet is addressed to them. This architecture requires that every plug-in module PCB monitors all data on the optical bus. The limitation that every PCB monitor all the data on the optical bus limits the rate at which data is transmitted over the bus to the rate at which every PCB can receive and process the data.

The typical passive optical bus architectures require that optical signals be received on a photodetector array, converted to electronics, and then routed to an electronic IC for further processing. Hence, the peak bandwidth is limited to the peak I/O bandwidth of an electronic integrated circuit, typically tens of Gigabits/second. Thus the passive optical bus is simply a faster version of a conventional electronic bus and it does not provide the high bandwidth required by large-scale computing and communication systems.

Most often, the passive optical technology is used to provide point-to-point high bandwidth connectivity and nothing else. The underlying architecture does not support broadcast channels, one-to-many communications over a single channel, or one-to-all communications over a single channel, simultaneous many-to-many communications over multiple channels. The architecture simply implements multiple passive point-to-point interconnects with no broadcasting. Since this architecture cannot support broadcasting it will have limited use in computing and communications systems which require efficient broadcasting.

Furthermore, the passive optical architecture has power limitations as the number of receivers increases, because the architecture does not allow for the regeneration of optical signals. A fraction of each optical signal is delivered to each photodetector receiver through the use of partially reflective micromirrrors. This free-space technique allows an optical signal to be delivered to a small number of receivers, but it cannot be used to interconnect a large number of receivers since the original optical signal can only pass through a limited number of partially reflective mirrors before the signal is lost.

Overall, the complexity and cost of the prior art systems have prevented large-scale integration. Thus, there is a need for increased system bandwidth through both increased data rates and improved mechanical and electrical interconnects.

Latency is the amount of time it takes for data to be sent from a source node to a destination node. One of the key impediments to significantly increasing the speed with which communications devices can communicate with one another is the very limited capability of existing systems to transfer data in parallel. Another impediment is the need for reading and interpreting the address of each data packet, whether or not the data is intended for that particular device. The process of reading and interpreting packet destination addresses is done at each device in the network, and results in a dramatic limitation in the speed of data transfer within the network.

Although some researchers have demonstrated Terabits/s serial connection, the methodology is overly complex and the price and size of these systems is impractical for system area networks. Recent innovations have permitted wavelength division multiplexing (WDM) systems to increase their bandwidth considerably, however, this is primarily a telecommunications (wide-area networking—WAN) solution. WDM systems are still relatively large and expensive, but compared to laying new fibers across the country the cost of the transmitters and receivers seems insignificant. For a local area network (LAN) or system area networks (SANs), WDM is generally cost-prohibitive and often will not meet form-fit-factors requirements. For LANs/SANs, the problems preventing effective wide bandwidth are: connector size and reliability, channel skew, wire impedance, and power dissipation.

A photonic switching system based upon smart pixel arrays is described in U.S. Pat. No. 5,289,303 ('303). The '303 patent describes a means for distributing packets of data based upon multiple stages of binary switches or nodes that receive data optically, switch data, and transmit data optically, repeatedly through a series of stages of such devices. The switching architecture is "self-routing" which implies an inherent notion of a packet of data with a header that contains addressing information. The nodes perform processing functions that enable them to change their states in order to propagate the connections in the appropriate direction within the switching network.

The '303 switching scheme between communicating modules must propagate through all stages of the network. The switch has an input side where all data must enter and an exit side where all data must exit. All communications, even those between modules that are physically close together, must enter the switch at the input side, travel through all the stages of devices and exit the switch at the output side, which can require excessive amounts of time. In a large system the length of fiber just to get data to the input side can cause excessive delays and similarly for the output side. Such multistage switch architectures have largely been abandoned by the parallel computing community, where fast communications between neighboring modules is very important. Furthermore, this switch architecture does not support plug-in modules or data transfers between neighboring plug-in modules.

What is needed is a means for reducing the latency so that it is not a significant factor in limiting data transfer. In other words, what is needed is a way of transferring data from one node in a network to any other node in the network in a bit-parallel manner in such a way that each intervening node that touches the data (whether switch or network interface controller—NIC) minimizes the time required to process data through. In the best case, the switch/device should act like wire or fiber and require no processing. What is needed is a way of resolving this address interpretation problem that eliminates the delay associated with the transfer of data. What is needed is a way to increase the number of ports without incurring the $N^2$ complexity of current designs. What is needed is a way to have the efficiency of a crossbar switch without the liability of a single-point-failure. What is needed is a way to build a crossbar without requiring so many pins and so many connectors into one physical device. What is needed is a uniform device that can be used as both NIC and switch so that the switching function is essentially free and the NIC function is inexpensive. What is needed is a device that does not increase message latency by requiring packet loss checks and frequent retransmission of packets when contention occurs. Ideally, what is needed is a network with wide channels, fast links, small and reliable connectors, low power, low latency, and minimal impact on higher-level communication protocols. From a practical point of view, these features must be offered as a cost-effective solution.

SUMMARY OF THE INVENTION

One object of this invention is an optical transmission system with a receiver reserved channel (RRC). By increasing the available channels, each node has its own dedicated channel (an RRC), even in very large networks. The optical system is formed by constructing arrays of transmitter/receiver pairs (transceivers) such that transmission on any particular RRC results in data being sent to a predetermined node. And, if that data passes through another node, it is recognized as belonging to another node and is sent on without pausing to check the address information in the header.

In a preferred embodiment this receiver reserved channel system is fabricated using semiconductor technology to incorporate the components of a node on a single IC. And, the communication to/from the nodes is via fiber optic cables arranged to permit bi-directional data flow from the transceiver arrays.

The present method and apparatus enables far more bits per channel compared to a traditional system, and the transmission can happen at far lower power due to lower capacitance. In this invention, an apparatus is described that allows more than 1000 channels and 1000 bits per channel. In addition, a method for using this apparatus is described which allows communication bandwidths in excess of $10^{15}$ bits per second.

Another object of this invention is the capability of one node to interleave incoming data of various packet sizes (and intended for other nodes) with data to be sent to yet other nodes.

An additional object of this invention is the use of RRC's to provide automatic and intrinsic addressing for the sensing and receiving of data in a network. Destination addresses are part of the data being sent in the prior art as opposed to being intrinsic to the process of sending and receiving of data point-to-point without reading destination address information. The physical addressing scheme as opposed to an encoded header reduces end-to-end latency.

A further object is the capability of sending and receiving alternately or simultaneously to any and all nodes in a network a signal whose bandwidth is limited only by the size of the arrays used to form the RRCs.

Another object is the use of FIFO's to avoid any packet loss and retransmission in the higher layer protocols.

Yet another difference between this invention and the prior art is that the present invention sends data in either direction in the case of a ring or mixed configuration. This allows the system to determine the best and/or shortest path to route communications. Another object is that each node has a watchdog function in which it watches its nearest neighbor for correct functionality. In the event a node fails, the nearest neighbor will wrap data from one direction to the other effectively "healing" the ring until the node is corrected.

In distinction to the prior art, the present invention involves RRC's that enable extremely high bandwidth communication between many systems with no reduction in performance due to the simultaneous use of the RRC capabilities by any or all of the systems. An important object of the invention is that the underlying topology is scalable.

An object of the invention is an apparatus that distributes the I/O of a crossbar switch among the nodes so that a pin-limited central switch is not necessary. Another object of this invention is a method of using RRC technology to form a distributed cross bar switch.

Additionally, an object includes a method of using rows in a transmission array in a network node to send data and columns in a network node to receive data to form a distributed cross bar switch. An object of this invention is that it distributes complexity and I/O among distributed clients thus enabling large switches to be built that were previous pin-limited. However, from a Node's perspective, the distributed interface looks essentially like a crossbar.

Another object of this invention is that it improves fault-tolerance by distributing the switching function to many nodes. One failure will not kill the entire network.

Yet a further object of this invention is that it substantially increases aggregate bandwidth because the system is no longer pin-limited.

Another object of this invention is where the transmission is optical radiation, preferably at 850 nm.

A further object of this invention is a method for having a cross bar switch, but with tremendous fan out capability.

An object of the invention is an optical data communications device fabricated as an integrated circuit, comprising an array having a plurality of transceivers arranged to form channels, wherein the transceivers are capable of transmitting and receiving optical data. There is a processing unit for controlling data flow, wherein the processing unit designates a dedicated receiver channel for receiving the optical data, and a gate controller for gating the optical data, wherein the gate controller regulates the data flow and prevents loss of packet data.

An object includes an optical data communications further comprising a plurality of fiber optic cables connecting to the transceivers for the transmitting and receiving of the optical data.

Additionally, an object is an optical data communications device, further comprising a means of storing the optical data. For example, the invention includes an optical data communications device, wherein the means of storing is a first-in-first-out (FIFO) buffer.

Yet another object is an optical data communications device, wherein the array is bi-directional and sends and receives the optical data. The present invention includes an optical data communications device, further comprising a means of routing data around a fault.

A further object is an optical data communications device, wherein the plurality of transceivers are arranged in order to have a dedicated pixel for each transceiver.

An object includes an optical data communications device, further comprising an address header with a destination address. Additionally, an optical data communications device, further comprising an address header with error checking.

And, an object is for an optical data communications device, wherein the processing unit is apart from the device and connects to the device by an off-chip interface.

Yet a further object is an optical data communications device, wherein the optical data is a plurality of variable length packets.

An object of the invention is a receiver reserved channel device for communicating on a computer system bus, comprising an array having a plurality of transceivers arranged to form channels, wherein the transceivers are capable of transmitting and receiving optical data. There is a processing unit for controlling data flow, wherein the processing unit designates a dedicated receiver channel for receiving the optical data, and a gate controller for gating the optical data, wherein the gate controller regulates the data flow and prevents loss of packet data.

Yet an additional object is a receiver reserved channel device for communicating within an integrated circuit, comprising an array having a plurality of transceivers arranged to form channels, wherein the transceivers are capable of transmitting and receiving optical data. There is a processing unit for controlling data flow, wherein the processing unit designates a dedicated receiver channel for receiving the optical data, and a gate controller for gating the optical data, wherein the gate controller regulates the data flow and prevents loss of packet data.

And an even further object is an optical data communications network, comprising a plurality of nodes, wherein the nodes contain a plurality of transceivers arranged to form channels of the transceivers, wherein each of the plurality of nodes has a dedicated receiver channel. There are a plurality of fiber optic cables interconnected with the transceivers for transmitting and receiving optical data, and wherein the fiber optic cables connect with each of the plurality of nodes. Furthermore, there is a means of controlling data flow, wherein the optical data transmitted on the dedicated receiver channel passes through the plurality of nodes and is only removed by the node having the dedicated receiver channel.

An object includes an optical data communications network, wherein the network is selected from the group consisting of a ring network, a star network, and a mixed network.

An object of the invention is a method of communicating on a network containing nodes with a receiver reserved channel, comprising the steps of sending optical data from a first node to a second node on a transmission channel, passing through the optical data to a next node when the transmission channel is the reserved channel of the second node; and removing the optical data when the transmission channel is the receiver reserved channel.

An object includes a method of communicating on a network, further comprising a step of storing the optical data when there is contention on the transmission channel. And, a method of communicating on a network, wherein the storing is using FIFO buffers.

A further object is a method of communicating on a network, wherein the step of passing through the optical data is done without reading a destination address.

An object of the invention is an integrated circuit crossbar switch designed from a ring architecture, comprising a plurality of nodes, wherein each node has an array of transceivers arranged to form channels, wherein the transceivers are capable of transmitting or receiving optical data, and wherein each node has a means for controlling the optical data. There is a dedicated receiver channel on each of the nodes for receiving the optical data, and an optical interface connecting to each of the nodes.

Additionally, an object is an integrated circuit crossbar switch, wherein the plurality of transceivers are arranged in rows for transmitting data and columns for receiving data. And, an integrated circuit crossbar switch, further comprising a means for simultaneous data transfer on a single channel.

An object includes an integrated circuit crossbar switch, further comprising a first-in-first-out (FIFO) buffer on each node for storing the optical data.

Finally, an object is for an integrated circuit crossbar switch, wherein the optical interface interconnects to each transceiver.

A practical upper limit is presently determined by the size of the reticles, power management, IC feature size, IC switch control complexity, and IC routing complexity. However such practical limits will disappear as technology advances. Even under existing technology, arrays as large as 1024×1024 are within the scope of the invention. Filling entire wafers with arrays has already been demonstrated, with arrays as large as 1000×1000.

One way to build large arrays, for example, is by attaching devices directly to a fan out fabric to make very large arrays. However as array sizes reach the order of 1,000,000×1,000,000, there would be enormous requirements for data and power for all of them to run all at the same time, but applications with enormous redundancy requirements or image processing links will require even larger arrays. Arrays can be extended to as large as 1M×1M, yielding in excess of $10^{15}$ bits/s aggregate raw bandwidth if each channel is clocked at 1 GHz. Regardless of these physical constraints, the protocol has no limit.

Most current computer protocols for SAN communication rely on narrow line widths (usually 1–16 data lines), transmit data point-to-point, and regenerate signals as needed until they get to their final destination. This process requires each intermediate node to decode the address information before passing data to the next point.

In one embodiment of the present invention, all of the transceiver pairs are connected via a fiber optic cable. The underlying physical transceivers provide enough bandwidth that the point-to-point connections do not need to use shared media for communication. As a result, there is no need to decode headers before making a decision to pass the data on or not. This combination of fast pass-through and unshared media provides a very low latency protocol with very high channel bandwidth. For example, a 32×32 element array with a 1 Gbit/sec per pixel results in a system transmission rate greater than 1 Tbit/sec and typical node-to-node latency of a couple of nanoseconds in point to point transmission and less than 50 nanoseconds between furthest neighbors in ring configurations. As clock speeds increase, these delays decrease.

It should be noted that the optical fiber may be composed of a single physical fiber that carries all of the light from an emitter or to a detector. Alternatively, the optical fiber can be composed of a multitude of physical fibers each of which carry a portion of the total light from an emitter or to a detector.

This invention not only enables significantly greater bandwidth to be used by multiple systems simultaneously, but with addressing and the decoding of the addresses being an intrinsic part of the invention, the presence of receiving node address information within the data stream itself (which is currently a practice dictated by necessity) becomes redundant. Therefore, because of not only the increase in system bandwidth, but because it is no longer necessary to include addressing information in data streams, there is time and pixel space to include other functions without time penalty. For example, it is possible to incorporate error checking or other security procedures.

Most importantly, the complexity of the control is greatly reduced as are the number of pins required to get data on and off chip. That is, the input-output (I/O) function is distributed across many integrated circuits rather than trying to build one large central IC switch. These two features allow significantly larger "crossbars" to be built without affecting reproducibility. Specifically, the logic complexity changes from the order of $N^2$ to the order of N and the number of pins at any given node decreases from 2N×M to 2M, where N is the number of input ports and M is the number of lines in a channel.

This basic scheme can be scaled up to arbitrarily large amounts of data, as long as several conditions are satisfied: (1) Each channel on each node has a FIFO buffer as long as the longest packet; or (2) the communication protocol software includes an arbitration scheme that allows connection oriented transmission that avoids contention at the hardware level. When the amount of data exceeds the capacity of the FIFO size, then there are multiple transmissions of data as separate packets. Thus, in general, if there are N bits of data to be sent through nodes set up with channels with M bits, there will be Ceiling (N/M) transmissions of data from Node A (where the function Ceiling (x) is the smallest integer not less than x), where the last transmission will be for less than M bits if N/M is not an integer. These transmissions will be followed by Ceiling (N/M) receptions and transmissions of data at Node B as that node passes the data to the next Node. To prevent FIFO overflow, the local CPU must wait before sending a packet on a channel until that channel's FIFO is empty. Alternately, a CPU might be required to get an acknowledgement packet from the destination before sending the next packet, in the communication protocol software. In summary, long and variable data message lengths are possible, but require protocol and/or hardware features to resolve.

Although the preferred embodiment is to use a channel for each node, there are alternate embodiments that can be used. One alternate method is to encode a source address and/or destination address(es) in the first few bits of data. For transmitting large quantities of data from relatively few sources, or if the data comes from multiple units of time in a packet, this method could be efficient.

If there were a large quantity of data or a high degree of contention for receiver channels, one solution is to have a dedicated pixel for each transmitter-receiver pair. Then, for example, if data is received on channel 3 on pixel 1, then that data was from Node 1. An alternate way of describing this is to consider a two-dimensional grid of channels, where Node N always transmits on column N and always receives on row N. Then, if Node 1 wanted to talk to Node 3 it would use only the pixel(s) in row 1, column 3. Since now $N^2$ pixels are required for N nodes, fewer pixels and hence less bandwidth is available for each channel, which may be a disadvantage. On the other hand, this scheme has the advantage that no contention occurs on any of the channels and hence no FIFOs are required to buffer packets before sending them on to the next node. This scheme is called the "send-receive pair reserved channels" scheme (SRPRC).

The clock signal is preferably embedded in the data. Alternatively, it can be a separate pixel. If the clock signal is not embedded a phase-locked loop (PLL) needs to be included on every input channel, which costs more in terms of design time, integrated circuit real-estate, and power. Since the present system has more bandwidth, it is practical to have a separate pixel as a baseline with the option of moving to the PLL solution.

A channel does not have to be an entire row. The minimum quantity of transceivers is one transmitter and one receiver. In the above examples, we are sending four bits at each clock cycle. We could just as easily have sent 1 bit or 1,000,000 bits per clock cycle. There is no relation between the number of bits and the number of nodes. For example, one could have a 2×8 structured node, or a 1×16 structured node. From another perspective, there is a very strong correlation between the channel size and the routing complexity. Increasing the number of channels, and decreasing the channel width, makes the switch control more difficult. Decreasing the number of channels, and increasing the channel width, makes power distribution and skew management more difficult. Roughly speaking, it is easiest when channel width is about the same size as the number of channels.

Today's architectures generally use a shared medium, (e.g., SCI or Fiber Channel Arbitrated Loop). This invention provides non-shared channels that are completely independent. The off-chip interface can be implemented in several different ways. One embodiment described herein is to have a single computing source directly attached to a node. A second embodiment allows multiple nodes to access the off-chip interface, essentially time-division multiplexing the gate controller among multiple CPUs. Yet another implementation would be to double or triple the I/O pins at a node and enable multiple channels off a chip. This type of node might be appropriate for a central controller that was receiving significantly more data than other nodes. Alternatively, a complete multi-port network could be established for networks that need fewer node ports, but higher channel bandwidth. All of these configurations are easily implemented using the RRC scheme.

Data is packetized for transmission. Since data on channel has precedence, a node trying to send out a message may have the message interspersed through another message, or perhaps several messages. This data interleaving is a natural part of the protocol as each node tries to push its data out as fast as possible. Accordingly, the receiver has to reconstruct the original message based on the header information in the packet that identifies the source node and the packet ID and packet sequence number.

This feature inherently adds fairness to the system since long, low-priority packets cannot be queued up blocking more important data.

Because an individual node can send the same data on all channels simultaneously, this invention has tremendous fan out capability. Data can be sent to all other nodes from a given node if it is sent on all channels at the same time. However, the data arrives at destination nodes lo with some delay due to the transceiver action at intermediate nodes. Nodes with the greatest number of other nodes between the sending node and the receiving node suffer the worst delay. The data can also be sent serially in the sense that data going from one node to another with nodes in between can be read by the intervening nodes. This feature could be used to implement efficient broadcasting in the network, for example by designating one of the channels as being the broadcast channel that all nodes receive on.

Although the preferred embodiment is to use a channel for each node, there are alternate embodiments that can be used. As long as the number of channels available exceeds the number of nodes communicating, the physical addressing scheme will always perform best. In some cases, notably for a hierarchical switch fabric, a packet header including a destination address would be required. Since each intervening node using address encoding must look at the data header before passing the data on, performance will suffer somewhat in the form of additional end-to-end latency.

In a ring or mixed architectural configuration, each node has a watchdog function in which it watches its nearest neighbor for correct functionality. In the event a node fails, the nearest neighbor will wrap data from one direction to the other, effectively "healing" the ring until the node is corrected. Thus fault-tolerance can be built in to the system. This technique is well known in the prior art and is in use today in single-fiber standards like FDDI (the Fiber Distributed Data Interface).

A related operability issue is the confinement of the CMOS circuitry to a small enough region that the array size is not forced to be larger than is optimal. However, there are approximately 100 um×100 um of area available for each pixel, plenty of room for a fair amount of logic per pixel with current integrated circuit device geometries.

Another operability issue is that with especially large arrays, there is increased potential for errors due to noise, device failures, and bit errors, so there may need to be additional error correction features.

Another operability issue, one that applies in particular to especially large arrays (e.g. of the order of 1M×1M arrays), is the large amount of power that is required run all of the pixels at once. Segmenting the arrays allows more room for providing access to the transceiver elements, and improvements in device design and specialized cooling systems allow much of the associated cooling problems to be addressed.

Also, for a network that includes computers operating at different speeds, the system would be more complex to accommodate the effect of the speed differences on the timing.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

Still other objects and advantages of the present invention will become readily apparent to those skilled in this art from the detailed description, wherein we have shown and described only a preferred embodiment of the invention, simply by way of illustration of the best mode contemplated by us on carrying out our invention. As will be realized, the invention is capable of other and different embodiments, and its several details are capable of modifications in various obvious respects, all without departing from the invention.

BRIEF DESCRIPTION OF THE DRAWINGS

FIG. 5 8×8 cross-bar switch

FIG. 7C timing diagram illustrating data flow of 4 node ring network

DESCRIPTION OF THE PREFERRED EMBODIMENT

To those skilled in the art, the invention admits of many variations. The following is a description of a preferred embodiment, offered as illustrative of the invention but not restrictive of the scope of the invention. This invention involves a method and apparatus for transferring data within the nodes of a communication system that is novel in several ways. The invention is a dramatically increased capability for transmitting and receiving data within a network. These novel aspects will be discussed in terms of several scenarios that demonstrate the various aspects of the invention.

Figure 1:
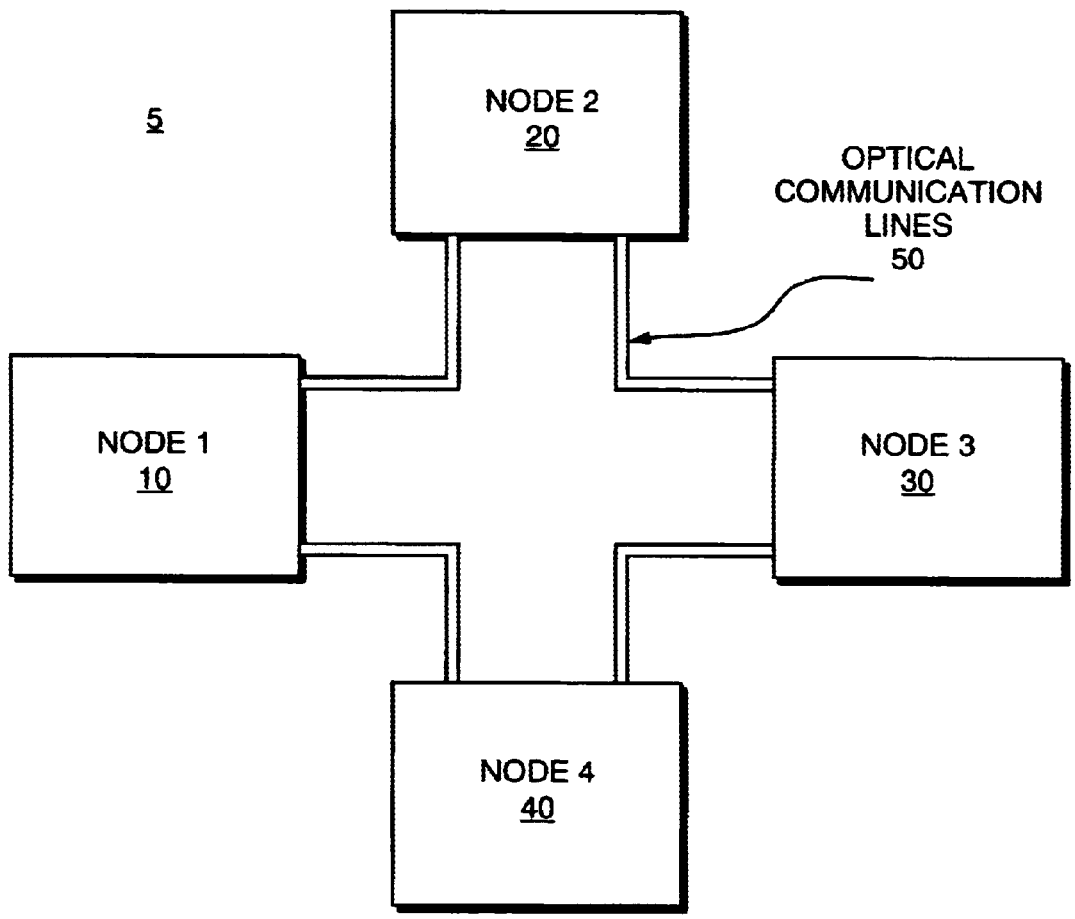
FIG. 1 network consisting of four nodes in a ring configuration

Computer networks are configurable in several topologies, such as a ring, a star, a multi-drop bus, or hybrid ring/star. FIG. 1 shows a network consisting of a ring configuration 5. There are four nodes, Node 1 (10), node 2 (20), node 3 (30) and node 4 (40), which are all interconnected by communication lines 50. The interconnecting communication lines in the is preferred embodiment are optics, such as fiber optic bundles or free-space optics. In this ring configuration 5, node 1 connects to node 2 and node 4; node 2 connects to node 1 and node 3; node 3 connects to node 2 and node 4; and finally, node 4 connects to node 3 and node 1—completing the ring.

A ring topology is well known in the art, and in the conventional prior art rings, data is transferred around the ring until it reaches the destination node. The data that is being transferred around the ring contains destination address information along with additional data and error coding within the header portion. If data is sent from node 1 to node 3, the data would enter one of the intermediate nodes which would read the destination information before allowing the data to continue transmission to node 3. There is a significant delay in having the node read the various addressing information for each packet of data.

Figure 2:
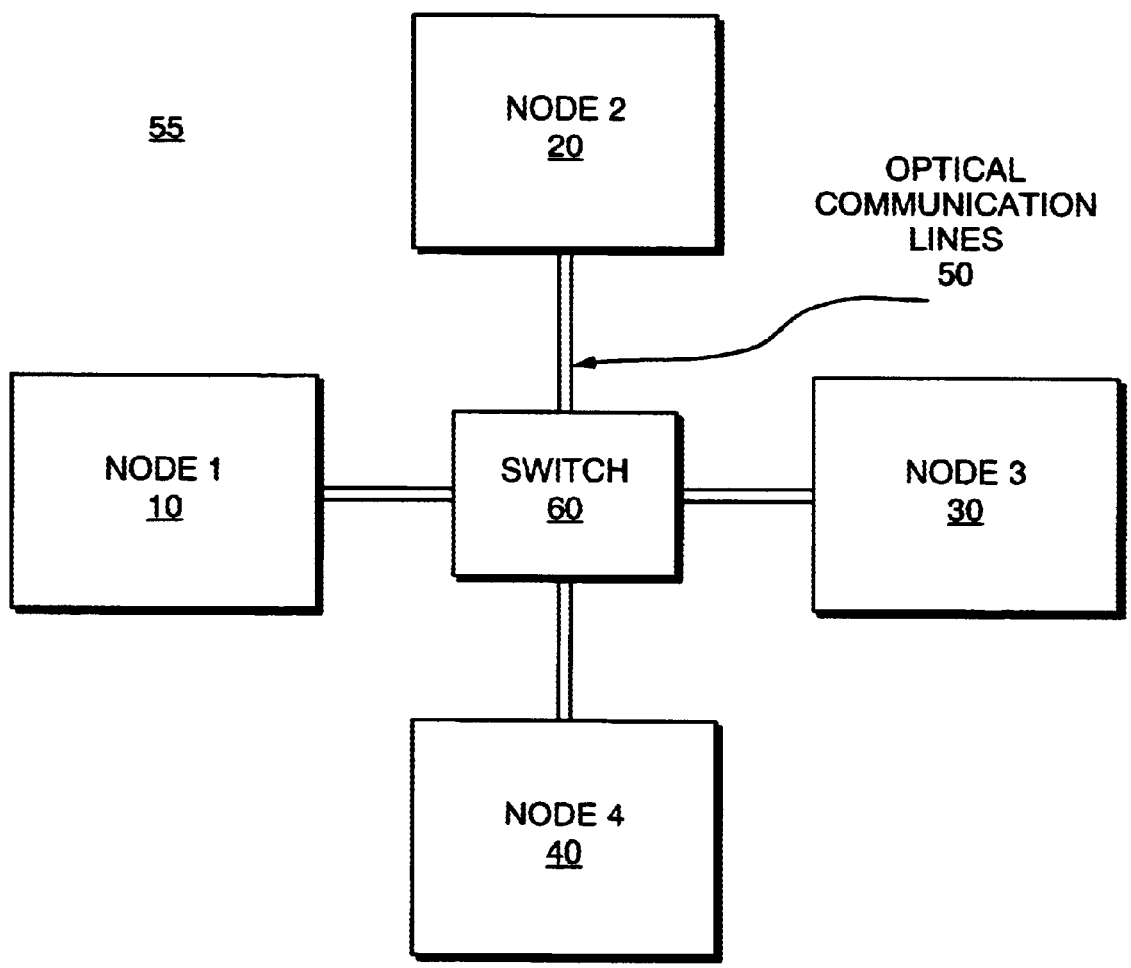
FIG. 2 network consisting of four nodes in a star configuration

FIG. 2 depicts a network consisting of four computers connected in a star configuration with four nodes 10, 20, 30, 40 and a switch 60 interconnected by optical communications lines 50. In the star configuration the switch 60 directs the communications. Such a network configuration is well known in the prior art.

Figure 3:
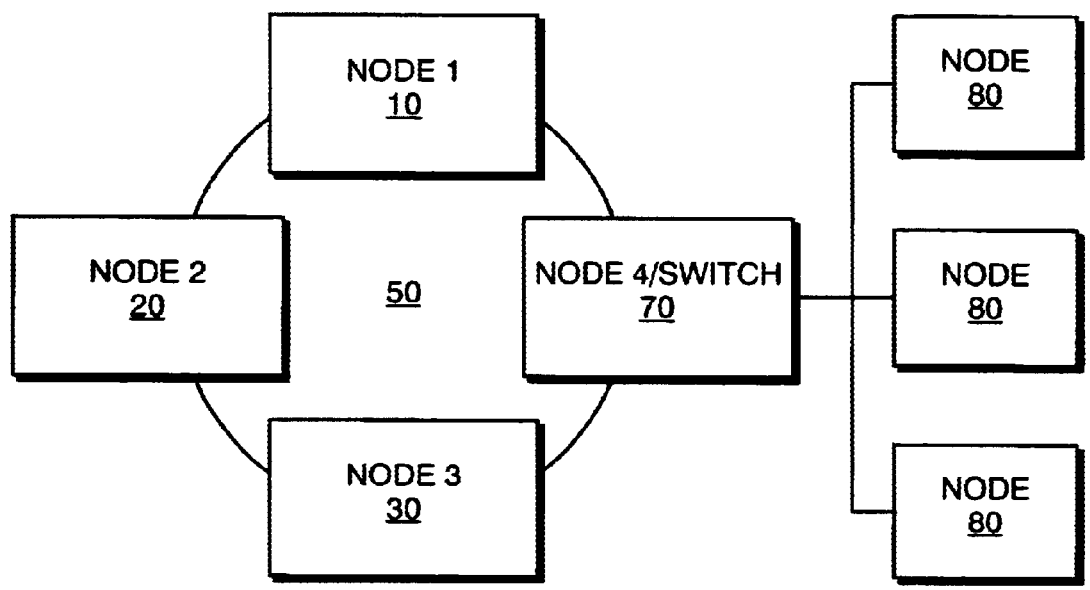
FIG. 3 network consisting of nodes in a mixed configuration

A mixed configuration 75 is shown in FIG. 3, combining a ring configuration 5 and a star configuration 55. In the mixed version, node 4 (70) acts as a switch for the three attached nodes 80 as well as functioning in the normal ring node capacity. The ring nodes 10, 20, 30, 70 are able to communicate with the other nodes 80 through the node 4/switch (70).

In a full crossbar switch system, every node can communicate with every other node and no permutation of in-port-to-out-port pair affects the speed or connection of another pair. That is, any input port can be mapped to any output port at any time without interference from any other connection. This is different than a switch made from a switch fabric, in that a switch fabric is usually built from smaller, easier-to-build crossbars, but often has a small probability of contention.

Figure 4:
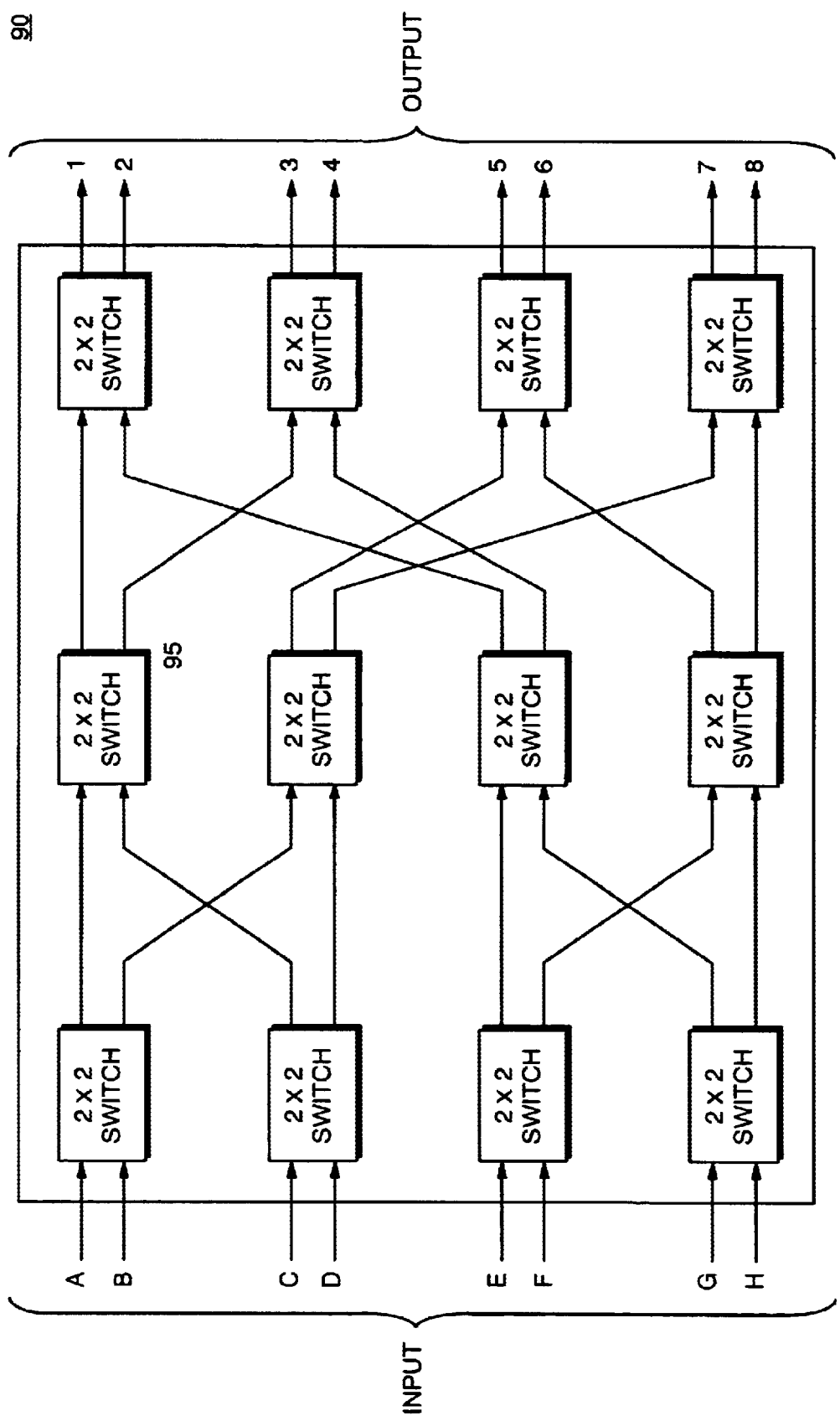
FIG. 4 switch fabric representation
Figure 5B:
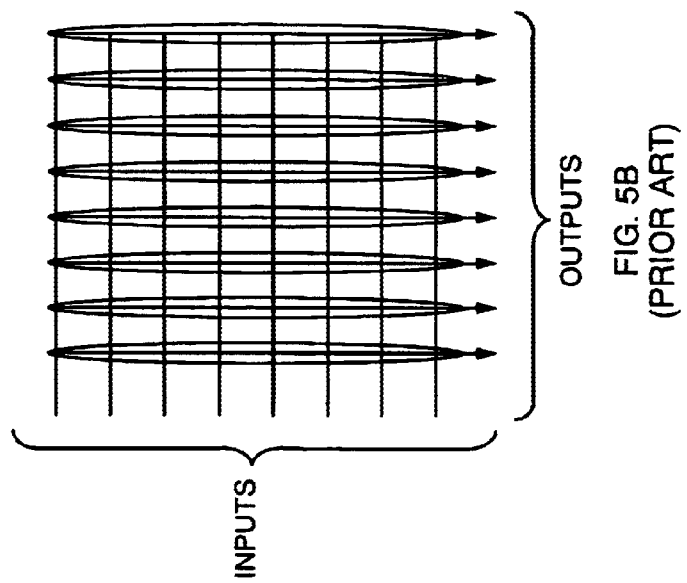
Figure 5A:
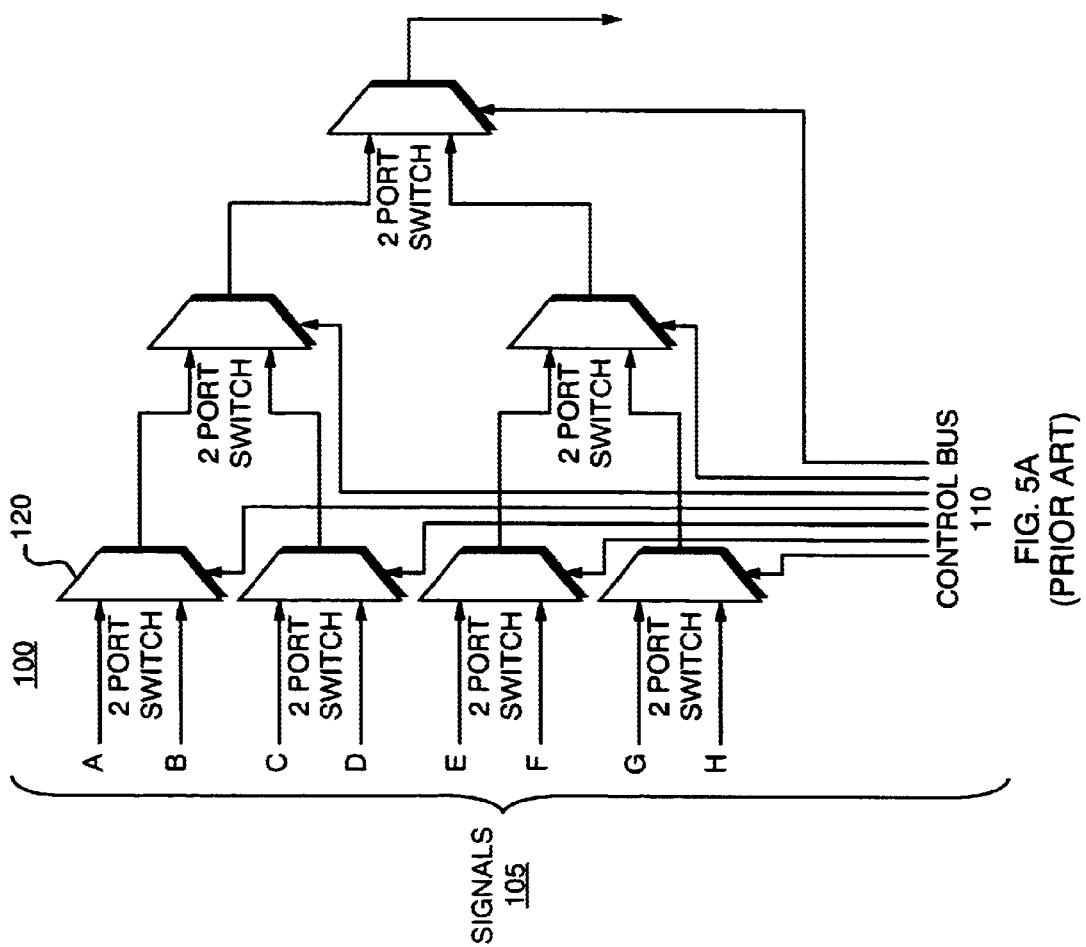

For example, in FIG. 4, a switch fabric 90 contains a plurality of 2×2 switches 95 interconnected so that any Input (A–H) can connect to any Output (1–8). However, if A is connected to 1 and C is connected to 3, it is not possible to connect B to 2, even though it appears that nothing is connected to them. This is called contention or blocking and it is the down-side to making large switch fabrics from inexpensive small crossbars. With a true crossbar, any combination is possible at any time as long as the ports are free.

The difficulty in building a crossbar is the large number of input/output signals required on the crossbar device as the number of nodes becomes large. An N-port crossbar with B-bit-wide channels requires 2*N*B IO signals. This is reasonable for N=8 nodes and N=16 bits, requiring 256 signals, and is possible using a single IC. However, if N were to be 100 nodes and B were 32 bits, 6,400 signals would be required. Although the logic consisting of cascaded multiplexers (as shown in the FIG.'s 5A and 5B) would easily fit on a single IC, the number of I/O pins would be prohibitive, requiring the design to be partitioned across 15 to 20 chips with currently technology, which in turn would probably require an extra printed circuit board (PCB) at the system level.

Figure 6A:
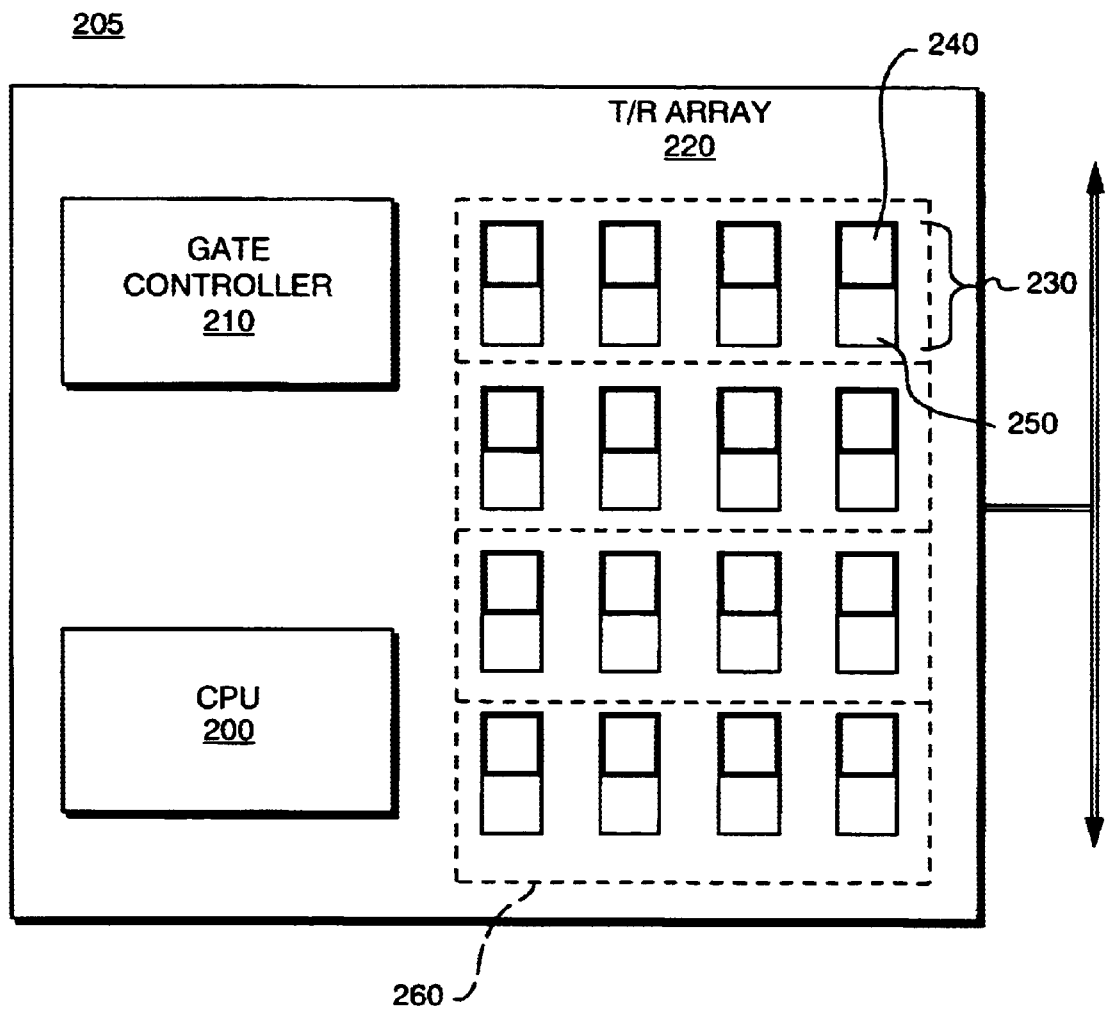
FIG. 6A receiver reserved node with row channels

FIG. 6A shows one representation of a receiver reserved node containing a CPU 200, a Gate Controller 210, and a two-dimensional array 220 of transceivers 230, where each transceiver contains a transmitter portion 240 and a receiver section 250. The transmitters 240 are shown as black boxes, and the receivers 250 are depicted as empty boxes. One transmitter 240 and one receiver 250 comprise a transceiver 230 pair. In this figure, the transceiver array 220 is depicted as a 4×4 array for demonstration purposes. The arrays are scalable, and arrays as large as 256×256 have been validated and larger arrays are well within the scope of the invention. In addition, the arrays 220 do not have to be of equal length in both dimensions.

The CPU 200 generates data to be sent on the network, and receives incoming message data from the network originating from other CPUs. The CPU is the processing center that directs data coming from another node or from another source. The CPU receives the incoming data/messages and is responsible for reading the header information. As noted herein, this information would be minimal, as the addressing information is determined by the channel being used and not by the destination address information in the header. Depending upon which protocol is being used, the header may contain the length of the data and possible some error correction scheme. The gate controller 210, by contrast, regulates the flow of this data over the optical interconnect, and is responsible for preventing loss of packet data due to contention for the same channels by multiple CPUs' messages.

Each node is assigned a set of transceiver pairs 230 that is defined to be a channel. As shown, a group of four transceiver pairs are defined as a "channel" 260, however, there can be N pairs of receivers 250 and transmitters 240 and the present invention is not confined to any number of transceiver pairs 230 within a channel 260 or for the node. The transceiver array 220 is separated into four rows of four transceivers 230, forming four channels 260 of four bits. In this embodiment, each transceiver 230 has a fiber optic connection. The data is transmitted or received in lengths of four bits as controlled by the gate controller 210 in cooperation with the CPU 200. The bits can be used not only for transferring data, but for security or error-checking functions. If each pixel was operating at 1 Gbit/sec, then each channel operates at 4 Gbit/sec to transmit or receive.

Figure 6B:
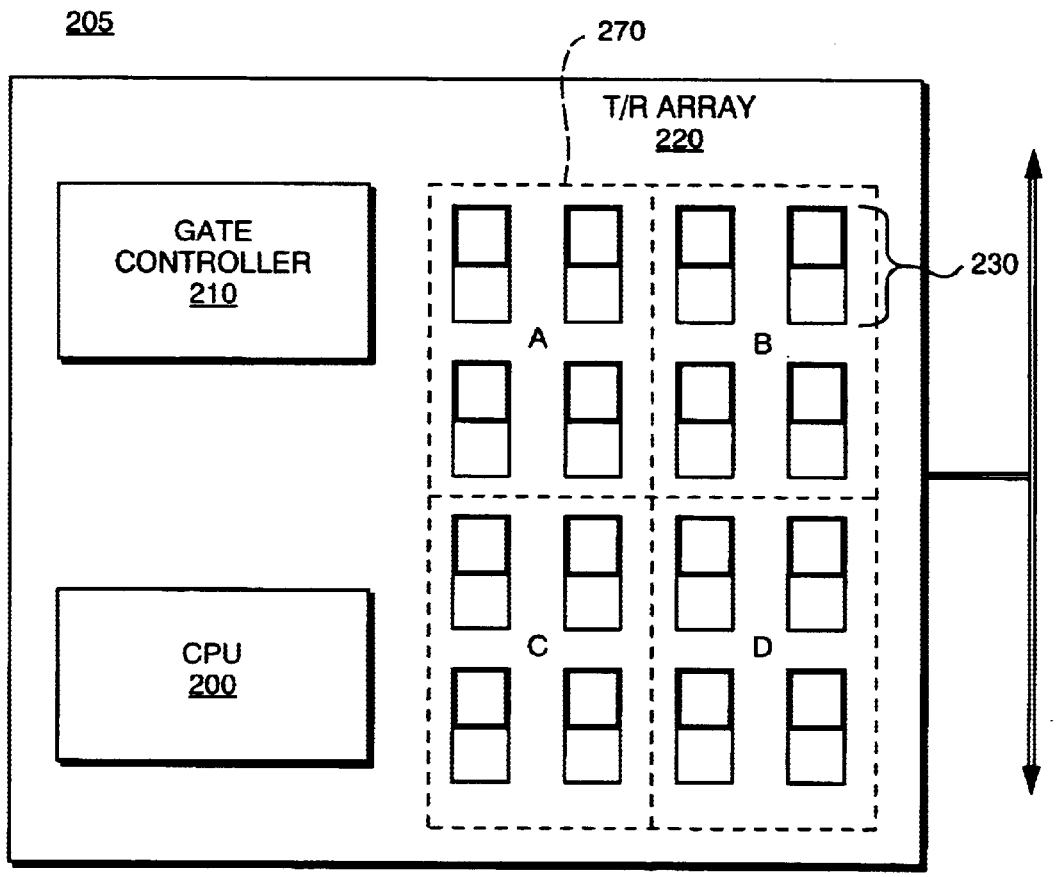
FIG. 6B receiver reserved node with block channels

FIG. 6B shows a transceiver array 220 in an alternate arrangement wherein the individual transceivers 230 are arranged in blocks 270 of four transceivers 230 per block 270. This square representation translates into each block 270 being a channel of four bits, and shows it may be divided for providing multiple photonic I/O channels in order to build topologies other than rings, such as star or mixed network configurations. The electrical and functional configuration of each node array will depend upon how many other nodes are directly connected.

The term receiver reserved channel (RRC) means that each node has associated with it a channel on which it always receives data. If node 1 wants to send data to node 3, anything received by node 3 on channel 3 is for node 3. Anything received by any other node on channel 3 is recognized as data to be transmitted to node 3.

At each node, the data is actually being detected and regenerated. The delay time is made small because the response time of the detector and the receiver is of the order of picoseconds. In isynchronously-driven digital systems the clock still needs to be resynchronized and retransmitted, so the pass-through still costs 2–3 clock ticks or roughly 3 nanoseconds with current clock rates —which is still very good as compared to prior art systems. Furthermore, in synchronous systems, even this delay may not be required.

In general, communication is assumed isochronous. That is, every node in the system has its own independent clock that is running very close to the same frequency. For example, three different nodes within the system might have frequencies of 1,000,000,000.12 Hz, 1,000,000,000.25 Hz, and 1,000,000,000.17 Hz. Although very close, the relative phase difference between the clock signals from each of these nodes will vary with time and the system must be able to compensate for this phase drifting. An example from the prior art of how this can be accomplished is the "bit stuffing" and framing techniques employed in the SONET (Synchronous Optical Network) standards for single-fiber telecommunication networks.

The scheme is robust enough that it can handle both synchronous and asynchronous communication paradigms. However, for a system area network, isochronous communication is often the preferred choice because stable, reliable clock signals can be generated locally at each node.

As a bi-directional data flow node, the node can send data in either direction. Thus, the best and/or shortest path may be used to send the data. This enables the system to be self-healing, wherein the data is send in an alternative path.

In contemporary ring communication systems, the medium is shared, which requires that a node can either transmit or pass data through. The present invention has multiple, non-interfering data channels, so that a node can simultaneously place data on one channel while passing data through on several others. The multiplicity of data paths provides considerable higher performance and lower latency than can be achieved with today's networks.

In effect, the ring architecture acts like a full crossbar switch without the switch complexity. For example, a 64×64 switch would be difficult to build, require a significant chassis to house the connections, have a fairly long latency (probably 200+nanoseconds), and would be very expensive. The current invention enables the same functionality with one small connector, no single-point-of-failure, and low latency. The latency in a network configuration is expected to be less than 50 nanoseconds. Note that these values are appropriate for clock speeds available today; as CMOS rates improve, this delay will naturally decrease. In a ring network embodiment, the present invention distributes the I/O of a crossbar switch among the nodes so that a pin-limited central switch is not necessary.

In one embodiment the present invention uses rows of the transmission array in a network node to send data and columns in a network node to receive data to form a distributed cross bar switch. Since the ring topology multiplies the delay of every node by the number of nodes on the ring, it is essential for low latency that the pass-through delay be minimized. The present invention provides an isochronous front end that consumes most of the delay and is unavoidable (on average 1 clock tick). A second clock tick is necessary to register the data and retransmit using the local clock. Alternately, a source-synchronous clocking scheme can be used wherein each channel includes a sender-generated clock with the data, which avoids the extra clock tick required to resynchronize to the local clock on intermediate hops.

Each node contains a gate controller 210 that regulates the flow of data through the node. If the data is intended to go on to another node, the gate controller 210 allows it to do so. If the data is intended for that node, then the gate controller passes the data to the CPU 200 at the node. If both the local CPU and an incoming channel wish to transmit data on one of the outgoing channels, the gate controller manages the arbitration and temporary storage of data. The gate controller 210 is actually a relatively simple switch based that is initialized on power-up. Packet lengths can be variable (up to a maximum size) or fixed, depending on what protocols are used by the system software. One can tell data from an idle line by a flag bit that is sent with the data. There is an upper limit to the size of the packet since the pass-through FIFO needs to be at least as long as the maximum packet length. Since FIFO storage is probably implemented as logic flip-flops instead of random access memory (due to speed considerations), it is desirable to keep their size as small as possible to save IC real estate and power consumption, but also large enough to amortize the cost of adding a packet header to each packet of data.

In one embodiment of a ring configuration, the nodes are connected so each node is directly connected to two other nodes by a separate fiber optic bundle for each. In this case, the number of transceiver pixels could be divided physically in half, with each half dedicated to a separate fiber optic cable. This division could be represented, for example, by dividing the array into halves A–B and C–D. In this example, each node in the loop would have a RRC channel in each half of the divided array.

For example, in the configuration FIG. 6B, signals received from one node that are intended for another node, would enter on the A side of the array and be retransmitted to the other node on the B side of the array. The electrical connection would be established in the control circuitry of the array, either permanently or in a reprogrammable fashion.

Referring to the switch of the star configuration of FIG. 2, the array 220 would have to be divided to accommodate separate fiber optic cables for each of the Nodes 1–4. This is represented in FIG. 6B by dividing the array into quadrants A, B, C and D. In this configuration, each of the nodes could have a RRC, which in this case would be a single pixel in each of the quadrants A–D.

Figure 7A:
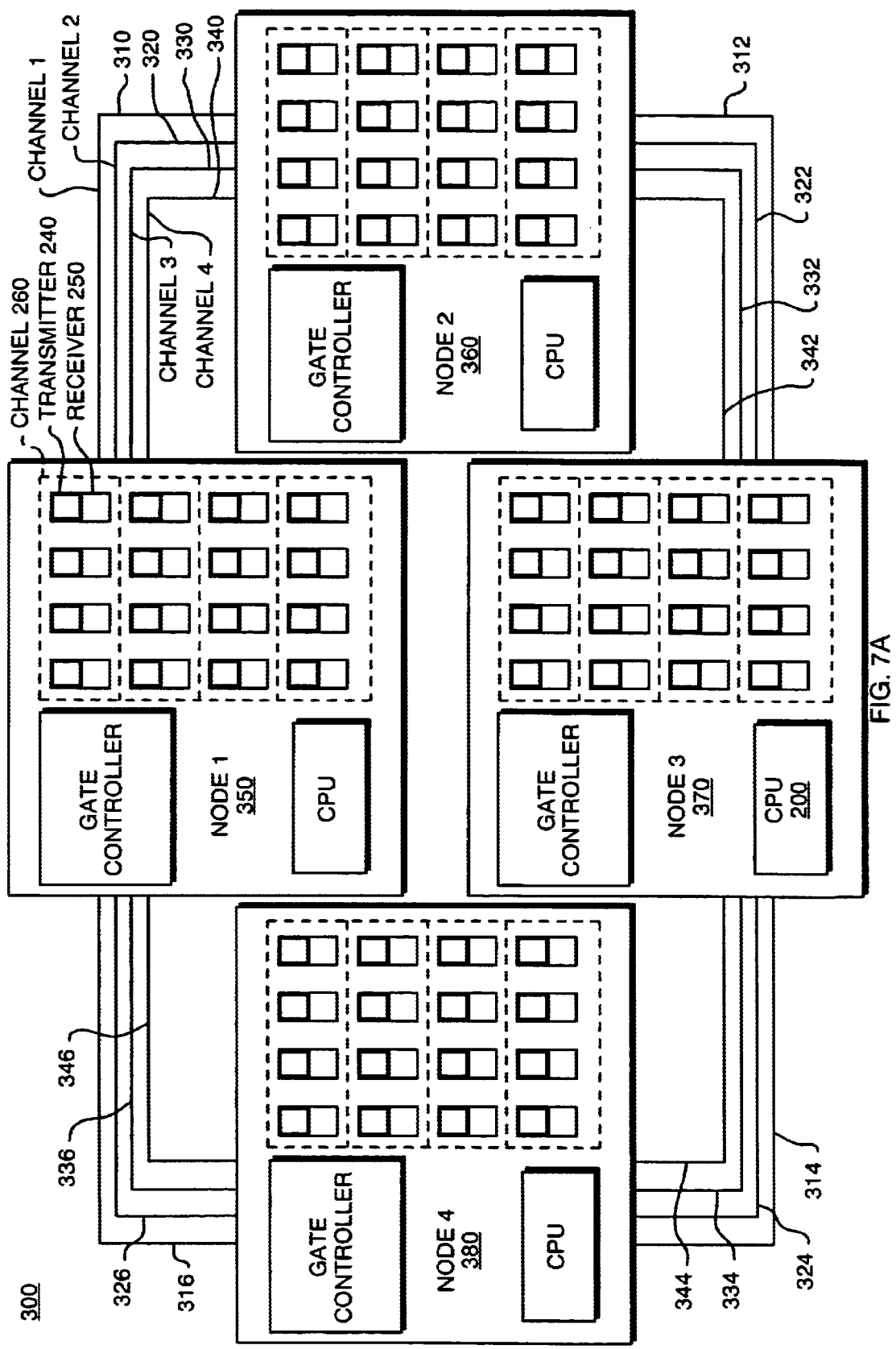
FIG. 7A illustration of 4 node ring network with interconnections

In FIG. 7A a ring network with four nodes 350, 360, 370, 380 is shown demonstrating the functionality of the RRC network 300. Suppose that node 1 (350) transmits on channel 3 (330). Node 2 (360) receives the data, but recognizes that the data is coming in on channel 3 (330), so the data is not intended for node 2 (360). Node 2 (360) therefore passes the data through the node without delay onto channel 3 (332). In this scenario, the next node is node 3 (370). Node 3 (370) sees the data coming in on channel 3 (332), and interprets it as data for node 3 (370). No look-up procedure is required, as the node simply recognizes the data on that channel as being for that node. The data at node 3 (360) is then pulled into the CPU 200.

The pass through operation has two possible routes depending upon whether there is contention. If there is simultaneous data communications on the same channel, some arbitration is required to ensure that data is not lost during the transfer from one node to the next. In one embodiment of the present invention, FIFO buffers are used to handle contention problems. The data is clocked into the FIFO buffers and is stored. Once the contention problem is removed, the data is transmitted to the next node. If there is no simultaneous data communications on the same channel, there is no contention, therefore there is no need for arbitration. The data that arrives on a pass through channel is not intended for that node, and the data simple passes through the node and onto to the next node.

Figure 7B:
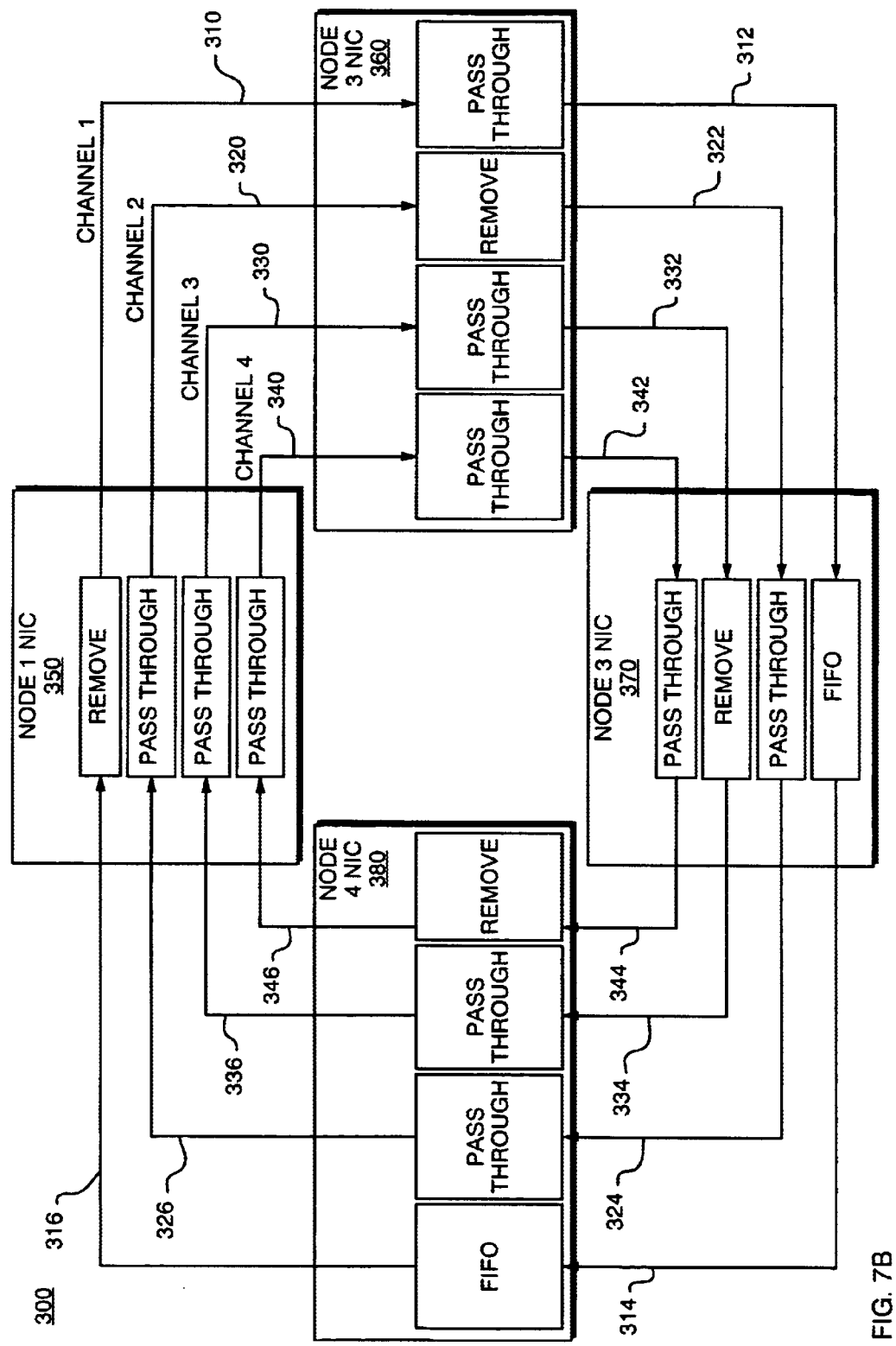
FIG. 7B illustration of 4 node ring network with interconnections and data flow

A different representation of the four node ring network is shown in FIG. 7B. Suppose node 2 (360), node 3 (370), and node 4 (380) all want to send data to node 1 (350). Assuming that the transmission time across the media is negligible, all of the nodes are sending data on their output channel 1 simultaneously. In the first unit of time, node 2 (360), node 3 (370), and node 4 (380) send their data to the next node in the ring via the respective channel 1 lines (312, 314 and 316, respectively).

Node 1 (350) can immediately begin removing data off channel 1 (316) since all data coming in on channel 1 (350) from Node 4 (380) is always for Node 1 (350). Node 1 (350) receives data from Node 4 (380) for an entire packet.

For this example, assume all packet lengths are 32 clock ticks long. Since Node 4 (380) is also receiving simultaneous data from Node 3 (370)—on channel 1 (314)—some arbitration must take place to ensure the output data is received by Node 1 (350) without losing the input data from Node 3 (370). This arbitration is done by putting incoming data into a first-in-first-out (FIFO) buffer until the packet being output is completely sent on channel 1 (316). In this case, since the outbound packet started at the same time the inbound packet arrived, the Node 4 (380) FIFO will store 31 clock ticks of data. Because the packet is a finite length, the FIFO length is bounded and no data will ever be lost. Once Node 4 (380) has completed transmitting its packet onto channel 1 (316), it begins transmitting the packet it received from Node 3 (350) at the next clock cycle.

Node 3 (370) has the same problem as Node 4 (380), in that Node 3 (370) is transmitting on channel 1 (314), and receiving data on channel 1 (312). Node 3 (370) will consequently store the incoming data on channel 1 (312) in the FIFO buffer until the output packet is completely sent on channel 1 (314). Once the data from Node 2 (360) is fully transmitted, Node 2 (360) is blocked from transmitting more data until the FIFO buffer is empty. As such, the FIFO buffer is assured to never overflow.

Node 2 (360) transmits data to Node 3 (370) on channel 1 (312), but is not receiving data so it has no extra work to do. At clock tick 32, Nodes 4 (380), Node 3 (370), and Node 2 (360) will all finish sending their packet. Nodes 4 (380) and 3 (370) will be blocked from putting new data on channel 1 (316, 314) until their FIFO buffers are emptied. That means at clock tick 33, Node 4 (380) begins sending Node 3's (370) original packet on to Node 1 (350) on channel 1 (316) that had been stored in the FIFO buffer. Likewise, at clock tick 33, Node 3 (370) begins sending Node 2's (360) packet on to Node 4 (380). At clock tick 64, Node 4 (380) and 3 (370) will complete their current packets, but Node 4 (380) still has a fill FIFO buffer because Node 3 (370) has been transmitting a packet as fast as Node 4 (380) was transmitting. At clock tick 65, Node 4 (380) begins transmitting the packet that originated with Node 2 (360). In this example, that is the last packet queued up, so Node 4 (380) will send the packet on to Node 1 (350) and at clock tick 96, the ring is idle once again.

A further explanation of the timing is shown in FIG. 7C. As in the previous example of simultaneous data transfer, three sets of headers/data are placed onto channel 1. Header 400 and data 410 from node 2 are transmitted as described, along with header 420 and data 430 from node 3 and header 440 and data 450 from node 4. The first communication received by node 1 is the header 440 and data 450 from node 4. Because there is no contention, the header and data are removed from channel 1 as the clock cycles information into node 1 at each rising edge.

The header 420 and data 430 from node 3 is stored in node 4 using the FIFO buffers are described herein. Once the contention problem is removed, the header 420 and data 430 can be transmitted to node 1 for removal. As this occurs, the header 400 and data 410 are clocked into node 4. Finally, as the contention problem disappears, the header and data coming from node 4 are received and removed by node 1. As discussed herein, the data information can be of any length as shown by the varying lengths of the data 410, 430, 450.

It should be obvious to those skilled in the art that in addition to extension to larger arrays, for example, one could have multiple data transfers, including simultaneous sending and receiving steps. Furthermore, communication from any one of them to any other one should be possible, and that all of the data will be transmitted simultaneously, thus demonstrating a system bandwidth that far exceeds the capabilities of the current art. By reassigning channels in higher-level software, a fan-out of data can occur; i.e. one node sends data that is received by all other nodes.

The objects and advantages of the invention may be further realized and attained by means of the instrumentalities and combinations particularly pointed out in the appended claims. Accordingly, the drawing and description are to be regarded as illustrative in nature, and not as restrictive.

What is claimed is:

1. An optical data communications device fabricated as an integrated circuit, comprising:
    an array having a plurality of transceivers arranged to form channels, wherein said transceivers are capable of transmitting and receiving optical data;
    a processing unit for controlling data flow, wherein said processing unit designates a dedicated receiver channel for receiving said optical data;
    a gate controller for gating said optical data, wherein said gate controller regulates said data flow and prevents loss of packet data.

2. An optical data communications device according to claim 1, further comprising a plurality of fiber optic cables connecting to said transceivers for said transmitting and receiving of said optical data.

3. An optical data communications device according to claim 1, further comprising a means of storing said optical data.

4. An optical data communications device according to claim 3, wherein said means of storing is a first-in-first-out (FIFO) buffer.

5. An optical data communications device according to claim 1, wherein said array is bi-directional and sends and receives said optical data.

6. An optical data communications device according to claim 1, further comprising a means of routing data around a fault.

7. An optical data communications device according to claim 1, wherein said plurality of transceivers are arranged in order to have a dedicated pixel for each transceiver.

8. An optical data communications device according to claim 1, further comprising an address header with a destination address.

9. An optical data communications device according to claim 1, further comprising an address header with error checking.

10. A optical data communications device according to claim 1, wherein said processing unit is apart from said device and connects to said device by an off-chip interface.

11. A optical data communications device according to claim 1, wherein said optical data is a plurality of variable length packets.

12. A receiver reserved channel device for communicating on a computer system bus, comprising:
    an array having a plurality of transceivers arranged to form channels, wherein said transceivers are capable of transmitting and receiving optical data;
    a processing unit for controlling data flow, wherein said processing unit designates a dedicated receiver channel for receiving said optical data;
    a gate controller for gating said optical data, wherein said gate controller regulates said data flow and prevents loss of packet data.

13. A receiver reserved channel device according to claim 12, wherein said processing unit is apart from said device and has an off-chip interface.

14. An optical data communications device according to claim 12, further comprising a plurality of fiber optic cables connecting to said transceivers for said transmitting and receiving of said optical data.

15. An optical data communications device according to claim 12, further comprising a means of storing said optical data.

16. An optical data communications device according to claim 12, wherein said means of storing is a first-in-first-out (FIFO) buffer.

17. An optical data communications device according to claim 12, wherein said plurality of transceivers are arranged in order to have a dedicated pixel for each transceiver.

18. A receiver reserved channel device for communicating within an integrated circuit, comprising:
    an array having a plurality of transceivers arranged to form channels, wherein said transceivers are capable of transmitting and receiving optical data;
    a processing unit for controlling data flow, wherein said processing unit designates a dedicated receiver channel for receiving said optical data;
    a gate controller for gating said optical data, wherein said gate controller regulates said data flow and prevents loss of packet data.

19. An optical data communications device according to claim 18, further comprising a plurality of fiber optic cables connecting to said transceivers for said transmitting and receiving of said optical data.

20. An optical data communications device according to claim 18, further comprising a means of storing said optical data.

21. An optical data communications device according to claim 20, wherein said means of storing is a first-in-first-out (FIFO) buffer.

22. An optical data communications device according to claim 18, wherein said plurality of transceivers are arranged in order to have a dedicated pixel for each transceiver.

23. An optical data communications network, comprising:
    a plurality of nodes, wherein said nodes contain a plurality of transceivers arranged to form channels of said transceivers, wherein each of said plurality of nodes has a dedicated receiver channel;

a plurality of fiber optic cables interconnected with said transceivers for transmitting and receiving optical data, and wherein said fiber optic cables connect with each said plurality of nodes;

a means of controlling data flow, wherein said optical data transmitted on said dedicated receiver channel passes through said plurality of nodes and is only removed by said node having said dedicated receiver channel.

24. An optical data communications network according to claim 23, wherein said network is selected from the group consisting of a ring network, a star network, a mixed network.

25. An optical data communications device according to claim 23, further comprising a means of storing said optical data.

26. An optical data communications device according to claim 25, wherein said means of storing is a first-in-first-out (FIFO) buffer.

27. An optical data communications device according to claim 23, wherein said plurality of transceivers are arranged in order to have a dedicated pixel for each transceiver.

28. An optical data communications device according to claim 23, further comprising an address header with a destination address.

29. An optical data communications device according to claim 23, further comprising an address header with error checking.

30. A method of communicating on a network containing nodes with a receiver reserved channel, comprising the steps of:

sending optical data from a first node to a second node on a transmission channel;

passing through said optical data to a next node when said transmission channel is not said reserved channel of said second node; and removing said optical data when said transmission channel is said receiver reserved channel.

31. A method of communicating on a network according to claim 30, further comprising a step of storing said optical data when there is contention on said transmission channel.

32. A method of communicating on a network according to claim 31, wherein said storing is using FIFO buffers.

33. A method of communicating on a network according to claim 30, wherein said step of passing through said optical data is done without reading a destination address.

34. An integrated circuit crossbar switch designed from a ring architecture, comprising:

a plurality of nodes, wherein each said node has an array of transceivers arranged to form channels, wherein said transceivers are capable of transmitting or receiving optical data, and wherein each said node has a means for controlling said optical data;

a dedicated receiver channel on each of said nodes for receiving said optical data;

an optical interface connecting to each of said nodes.

35. An integrated circuit crossbar switch according to claim 34, wherein said plurality of transceivers are arranged in rows for transmitting data and columns for receiving data.

36. An integrated circuit crossbar switch according to claim 34, further comprising a means for simultaneous data transfer on a single channel.

37. An integrated circuit crossbar switch according to claim 36, further comprising a first-in-first-out (FIFO) buffer on each said node for storing said optical data.

38. An integrated circuit crossbar switch according to claim 34, wherein said optical interface interconnects to each said transceiver.

* * * * *